(12) United States Patent
Kramer et al.

(10) Patent No.: US 8,590,360 B2
(45) Date of Patent: Nov. 26, 2013

(54) FLOWMETERS AND METHODS FOR DIAGNOSIS OF SENSOR UNITS

(75) Inventors: Axel Kramer, Wettingen (CH); Daniel Schrag, Lufingen (CH); Detlef Pape, Nussbaumen (CH); Kai Hencken, Loerrach (DE); Julio Danin Lobo, Baden (CH)

(73) Assignee: ABB Research Ltd., Zurich (CH)

( * ) Notice: Subject to any disclaimer, the term of this patent is extended or adjusted under 35 U.S.C. 154(b) by 480 days.

(21) Appl. No.: 12/958,756

(22) Filed: Dec. 2, 2010

(65) Prior Publication Data

US 2011/0132064 A1 Jun. 9, 2011

(30) Foreign Application Priority Data

Dec. 2, 2009 (EP) ..................................... 09177768

(51) Int. Cl.
*G01F 1/68* (2006.01)
(52) U.S. Cl.
USPC .............................. 73/1.16; 73/204.11; 73/861
(58) Field of Classification Search
USPC ...................................... 73/1.16, 204.11, 861
See application file for complete search history.

(56) References Cited

U.S. PATENT DOCUMENTS

| | | | |
|---|---|---|---|
| 4,487,063 A | 12/1984 | Hopper | |
| 5,056,047 A | 10/1991 | Sondergeld | |
| 5,780,736 A * | 7/1998 | Russell | 73/204.11 |
| 6,453,753 B1 * | 9/2002 | Koudal et al. | 73/861.02 |
| 6,550,325 B1 * | 4/2003 | Inushima et al. | 73/204.26 |

FOREIGN PATENT DOCUMENTS

| | | |
|---|---|---|
| EP | 0 373 414 A1 | 6/1990 |
| EP | 0 751 377 A1 | 1/1997 |
| EP | 1 512 948 A1 | 3/2005 |
| GB | 1 593 904 | 3/1978 |
| GB | 2 138 566 A | 10/1984 |
| GB | 2 173 905 A | 10/1986 |
| GB | 2 245 073 A | 12/1991 |
| GB | 2 283 328 A | 5/1995 |
| WO | WO 90/02317 A1 | 3/1990 |

OTHER PUBLICATIONS

European Search Report dated Jun. 8, 2010.
EPO Form 1703 dated Jun. 8, 2010.
UK Search Report dated Jan. 6, 1995.

\* cited by examiner

*Primary Examiner* — Hezron E Williams
*Assistant Examiner* — Rodney T Frank
(74) *Attorney, Agent, or Firm* — Buchanan Ingersoll & Rooney PC

(57) ABSTRACT

A method and an apparatus for diagnosis of a flowmeter are disclosed. The method includes thermally coupling a first sensor unit of the flowmeter to a fluid and thermally coupling a second sensor unit of the flowmeter to the fluid. The method also includes actively heating or cooling the first sensor unit by applying power to the first sensor unit such that its temperature is different from the temperature of the fluid, and simultaneously actively heating or cooling the second sensor unit by applying power to the second sensor unit such that its temperature is different from the temperature of the fluid, and typically from the temperature of the first sensor. The method can include determining a temperature TM0 of the fluid, and determining at least two independent quantities related to the heat transfer of the sensor units, each of the at least two independent heat transfer related quantities being determined from at least one element selected from the group including TM0, TM1, TM2, PM1, and PM2, and determining a diagnosis result by setting into relation the at least two independent heat transfer related quantities.

24 Claims, 7 Drawing Sheets

FLOWMETERS AND METHODS FOR DIAGNOSIS OF SENSOR UNITS

RELATED APPLICATION

This application claims priority under 35 U.S.C. §119 to European Patent Application No. 0917768.0 filed in Europe on Dec. 2, 2009, the entire content of which is hereby incorporated by reference in its entirety.

FIELD

The present disclosure relates to a method for diagnosis of a flowmeter and diagnosis of at least one sensor unit of the flowmeter.

BACKGROUND INFORMATION

Flowmeters can be used in a plurality of industrial fields such as chemical, petrochemical, oil, gas, energy, paper, water, sewage, food and beverage, and pharmaceutical industries. Flowmeters can be used for determining the flow rate of fluids, e.g., in pipes.

High measurement accuracy is a desired property of flowmeters. A particular type of flowmeter measures the flow rate, such as the mass flow rate, with the help of two temperature sensors. In such a flowmeter, the first temperature sensor can measure the fluid temperature $T_0$ and the second temperature sensor can be heated to a higher temperature $T_2$. The second temperature sensor can be cooled by forced convection which depends on the velocity of the fluid passing the sensor. The heating power needed to maintain the higher temperature $T_2$ can reveal a measure of the flow rate.

However, the measurement and hence the accuracy with which the flow rate is determined may be negatively influenced by mechanisms that influence the heat transfer, e.g. by forced convection, of the heated second temperature sensor to the fluid in an uncontrolled manner. One such mechanism can include a changing of the heat transfer due to a coating on the heated sensor. A coating may, for example, build up during operation in dusty, humid, oily, or sooty environments. Coatings can have a lower heat conductivity as compared to the materials of which the sensors are made. Hence, a reduced heating power may be needed to maintain the higher temperature for a coated sensor. The measured flow rate may then be wrong, for example too low, as compared to the actual flow rate.

It is thus desirable to detect sources of failure of the sensors. It has been proposed to switch the roles of the heated sensor and the unheated sensor for diagnosis, as the coating may be different for sensors operated at different temperatures. However, such a switching can be slow, especially because one sensor would need to cool down to the temperature $T_0$ of the fluid. During the cooling that occurs during the switching, it may be impossible to measure the flow rate, creating what is known as a dead time for the flowmeter. Further, the diagnosis may be unreliable if the flow conditions have changed during the dead time.

Improved methods for diagnosis of sensors in flowmeters and for flowmeters configured for such diagnosis of at least one of its sensors are desired. For example, methods and flowmeters are desired where dead times are avoided and reliable diagnosis is conducted at low costs.

SUMMARY

A method for diagnosis of a flowmeter is disclosed, comprising: thermally coupling a first sensor unit and a second sensor unit to a fluid, the fluid having a temperature TM0; actively heating or cooling the first sensor unit by applying power PM1 to the first sensor unit such that the temperature TM1 of the first sensor unit is different from the temperature TM0 of the fluid, and simultaneously actively heating or cooling the second sensor unit by applying power PM2 to the second sensor unit such that the temperature TM2 of the second sensor unit is different from the temperature TM0 of the fluid; determining a temperature TM1 of the first sensor unit and the power PM1 applied to the first sensor unit, and simultaneously determining the temperature TM2 of the second sensor unit and the power PM2 applied to the second sensor unit; determining at least two independent quantities related to heat transfer of the first and second sensor units, each of the at least two independent heat transfer related quantities being determined from at least one of TM0, TM1, TM2, PM1, and PM2; and determining a diagnosis result by setting into relation the at least two independent heat transfer related quantities.

A flowmeter is disclosed for flow rate measurement of a fluid and for diagnosis of at least one of a first sensor unit and a second sensor unit, the flowmeter comprising: a first sensor unit configured for thermally coupling to a fluid, the first sensor unit comprising a first temperature sensor and at least one first component selected from the group consisting of: a first heating device and a first cooling device; a second sensor unit configured for thermally coupling to a fluid, the second sensor unit comprising a second temperature sensor and at least one second component selected from the group consisting of: a second heating device and a second cooling device; a thermal control unit operatively connected to the first sensor unit and to the second sensor unit, the thermal control unit being configured for: applying power to the at least one first component; applying power to the at least one second component; and simultaneously, individually, and actively heating or cooling the first sensor unit and the second sensor unit such that the respective temperatures TM1 and TM2 of the first sensor unit and the second sensor unit are different from the temperature TM0 of the fluid; and an evaluation unit operatively connected to the first and the second sensor unit, the evaluation unit being configured for: determining the temperature TM1 of the first sensor unit by the first temperature sensor and the power PM1 applied to the at least one first component, and simultaneously determining the temperature TM2 of the second sensor unit by the second temperature sensor and the power PM2 applied to the at least one second component; determining at least two independent quantities related to heat transfer of the first and second sensor units, each of the at least two independent heat transfer related quantities being determined from at least one of TM0, TM1, TM2, PM1, and PM2; and determining a diagnosis result by setting into relation the at least two independent heat transfer related quantities.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1A:
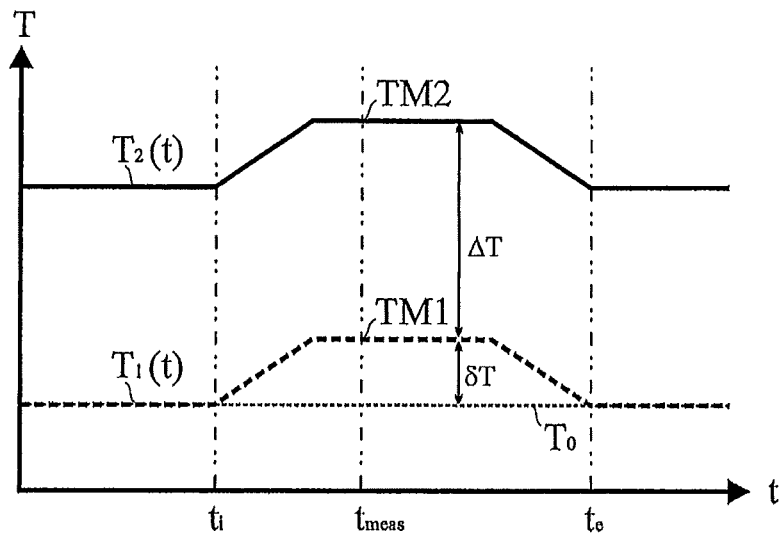
FIGS. 1A-1E show schematic graphs of temperature versus time illustrating methods for diagnosis of at least one sensor unit in accordance with exemplary embodiments described herein.

Exemplary embodiments of the disclosure provide a method for diagnosis of a flowmeter, and a flowmeter that can perform such a method.

According to an exemplary embodiment, a method for diagnosis of a flowmeter is provided. The exemplary method includes thermally coupling a first sensor unit of the flowmeter to a fluid and thermally coupling a second sensor unit of the flowmeter to the fluid. The method also includes actively heating or cooling the first sensor unit by applying power to the first sensor unit such that its temperature is different from the temperature of the fluid, and simultaneously actively heating or cooling the second sensor unit by applying power to the second sensor unit such that its temperature is different from the temperature of the fluid, and typically from the temperature of the first sensor. Optionally, the method may include determining a temperature TM0 of the fluid. The method further includes determining at least two independent quantities related to the heat transfer of the sensor units, each of the at least two independent heat transfer related quantities being determined from at least one element selected from the group comprising TM0, TM1, TM2, PM1, and PM2, and determining a diagnosis result by setting into relation the at least two independent heat transfer related quantities.

According to an exemplary embodiment, a flowmeter for flow rate measurement of a fluid and for diagnosis of at least one of a first sensor unit and a second sensor unit is provided. The flowmeter includes the first sensor unit configured for being thermally coupled to the fluid. The first sensor unit includes a first temperature sensor and at least one first component selected from the group consisting of: a first heating device and a first cooling device. The flowmeter also includes the second sensor unit adapted for being thermally coupled to the fluid. The second sensor unit includes a second temperature sensor and at least one second component selected from the group comprising (e.g., consisting of): a second heating device and a second cooling device.

The flowmeter can further include a thermal control unit operatively connected to the first sensor unit and to the second sensor unit, the thermal control unit being adapted to apply power to the at least one first component and to apply power to the at least one second component for simultaneously, individually and actively heating or cooling the first sensor unit and the second sensor unit such that their temperatures are different from a temperature of the fluid, and typically different from one another.

Additionally, the flowmeter can include an evaluation unit operatively connected to the first and the second sensor unit. The evaluation unit is optionally configured to determine the temperature TM0 of the fluid. The evaluation unit is configured to determine a temperature TM1 of the first sensor unit by means of the first temperature sensor and the power PM1 applied to the at least one first component, and for simultaneously determining a temperature TM2 of the second sensor unit by means of the second temperature sensor and the power PM2 applied to the at least one second component. The evaluation unit is also adapted for determining at least two independent quantities related to the heat transfer of the sensor units, each of the at least two independent heat transfer related quantities being determined from at least one element selected from the group comprising TM0, TM1, TM2, PM1, and PM2, and determining a diagnosis result by setting into relation the at least two independent heat transfer related quantities.

Embodiments are also directed to methods of operating the disclosed flowmeter. These method steps can be performed manually or automated, e.g. controlled by a computer programmed by appropriate software stored on a non-transitory computer-readable recording medium, by any combination of the two, or in any other manner.

Reference will now be made in detail to various exemplary embodiments, one or more examples of which are illustrated in each figure. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

Within the following description of the drawings, the same reference numbers refer to the same or similar components. Generally, only the differences with respect to the individual embodiments are described. The drawings are not necessarily true to scale and serve for illustration of the components shown, not as limitations of, e.g., size and form.

Figure 6:
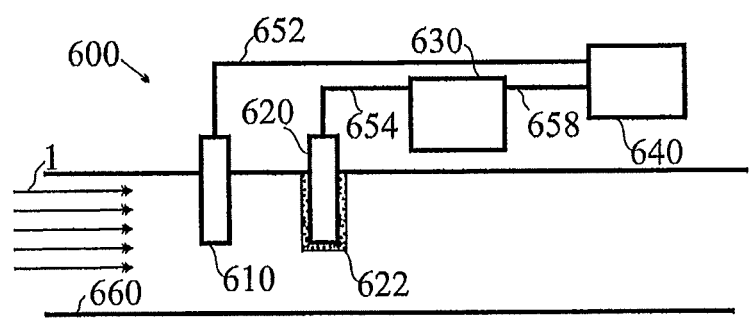
FIG. 6 shows an example of a flowmeter useful for understanding exemplary embodiments described herein.

In an example useful for understanding embodiments described herein, an exemplary flowmeter 600 for measuring the flow rate of the fluid is shown in FIG. 6. The flowmeter includes a first sensor 610, operatively connected to an evaluation unit 640 via a connection 652, a second sensor 620 operatively connected to a heating unit 630 via a connection 654, where the heating unit 630 is operatively connected to the evaluation unit 640 by a connection 658. The term "connection" as used herein refers to any channel for signal transmission, e.g. cables or wireless links.

In the present disclosure, the actual temperature function of a sensor or of the fluid is denoted with a name starting with "T" and having a subscript, e.g. $T_1$. A value of this function at time t will be denoted by $T_1(t)$. As is customary, sometimes also the function itself will be called $T_1(t)$. Likewise, the actual power function is denoted with a name starting with "P" and having a subscript, e.g. $P_1$, and the value of this function at time t is denoted by $P_1(t)$.

In contrast to the notation of the temperature and power functions, the measured (or controlled) temperature values or power values are denoted in the present disclosure by names starting with "TM" followed by a number without subscript, e.g. TM1. In this context, the temperature value TM1 can e.g. correspond to the value of the temperature function $T_1(t_{meas})$ at measurement time $t_{meas}$, up to measurement errors. The distinction between e.g. TM1 and $T_1(t_{meas})$ is not made where the underlying models and conceptual issues will be explained. The present disclosure also denotes a temperature value such as TM1 as a temperature. Quantities such as a thermal conductance or flow rate can be determined from the measured values.

In FIG. 6, the exemplary flowmeter 600 is used in a pipe 660 through which a flow 1 of the fluid can flow as indicated by the arrows. The evaluation unit 640 can determine a value TM0 of the temperature $T_0$ of the fluid. The temperature $T_0$ of the fluid can equal the temperature $T_1(t)$ of the first sensor 610, the first sensor 610 being in thermal equilibrium with the fluid. Further, the evaluation unit 640 can determine a temperature value TM2 of the temperature $T_2(t)$ of the second sensor 620 and a power value PM2 of the heating power $P_2(t)$ provided by the heating unit 630 to the second sensor 620. The evaluation unit 640 can determine the flow rate of the flow 1 as described in the following.

Figure 5:
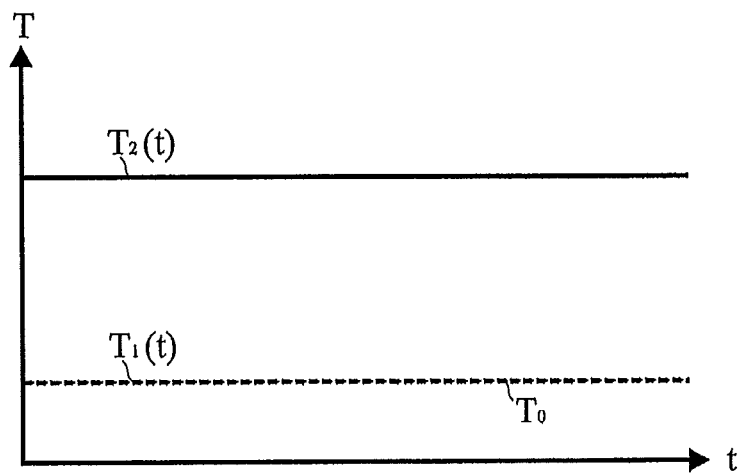
FIG. 5 illustrates a method for determining a flow rate which can be combined with the methods for diagnosis of at least one sensor unit in accordance with exemplary embodiments described herein.

FIG. 5 illustrates an exemplary method for determining a flow rate of a fluid, which can be combined with any of the embodiments described herein. In FIG. 5, a temperature function $T_1$ measured by the first sensor of a flowmeter is shown in a graph plotting temperature T against time t. In FIG. 5, the temperature $T_1$ is a constant function. Therein, the values of the constant function $T_1(t)$ represent the output of the first sensor of a flowmeter in thermal equilibrium with the fluid. The temperature $T_1(t)$ is thus equal to the temperature $T_0$ of the fluid. The temperature of the fluid can also be slowly varying over time. Further, the output of a second sensor of the flowmeter is represented by the function $T_2$. The temperature of the second flowmeter is higher than the temperature $T_0$ of the fluid. The temperature of the second flowmeter can also be lower than the temperature $T_0$ of the fluid. A temperature that is higher than the temperature of the fluid is referred to herein as an "over-temperature". Likewise, the term "under-temperature" references a temperature that is lower than the temperature $T_0$ of the fluid.

The exemplary method includes thermally coupling the first and the second sensor to the fluid, and measuring the temperature $T_0$ of the fluid. The second sensor can be heated with a constant heating power $P_2(t)$ and its steady-state over-temperature $T_2(t)$ can be measured. Alternatively, the over-temperature $T_2(t)$ can be controlled to be constant, as shown in FIG. 5, and the necessary heating power $P_2(t)$ to keep the fixed over-temperature can be measured. According to an exemplary aspect which can be combined with any of the embodiments described herein, the flow rate can be determined. For example, the flow rate can be determined from the formula $$P_2(t_{meas})/(T_2(t_{meas})-T_0)=A+Bv^{1/2} \qquad (1)$$

where $P_2(t_{meas})$ is the heating power of the second sensor at some measurement time $t_{meas}$, $T_2(t_{meas})$ the temperature of the second sensor at some measurement time $t_{meas}$, A and B are parameters which depend on the properties of the fluid and the sensor unit, and v is the velocity of the fluid. $T_0$ is here regarded as constant, or only slowly varying with respect to the length of the diagnosis cycle, such that no distinction is made between the function, its value at any given time and the measured value at a measurement time. The velocity of the fluid can be considered a measure for the flow rate. The heating (or cooling) power divided by the temperature change caused by supplying this power, and more generally a quantity with the dimensions of power divided by temperature, is referred to herein as thermal conductance. If the sensors operate normally (e.g., within their specified work characteristics), the velocity of the fluid, and therefore the flow rate, can be determined from the measured thermal conductance according to the above formula (1).

However, at least one of the sensors 610, 620 may become coated by a coating over time. In FIG. 6, a coating 622 on the second, heated sensor is shown. The first sensor 610 may be coated, too, but perhaps to a lesser extent due to its lower operating temperature. The coating on at least one of the sensors may negatively influence the accuracy of the determination of the flow rate. Coatings can have a lower heat conductivity as compared to the materials of which the sensors are made. Hence, a reduced heating power may be employed to maintain the over-temperature of a sensor with a coating. The measured flow rate may then be wrong, for example too low, as compared to the actual flow rate.

Figure 7:
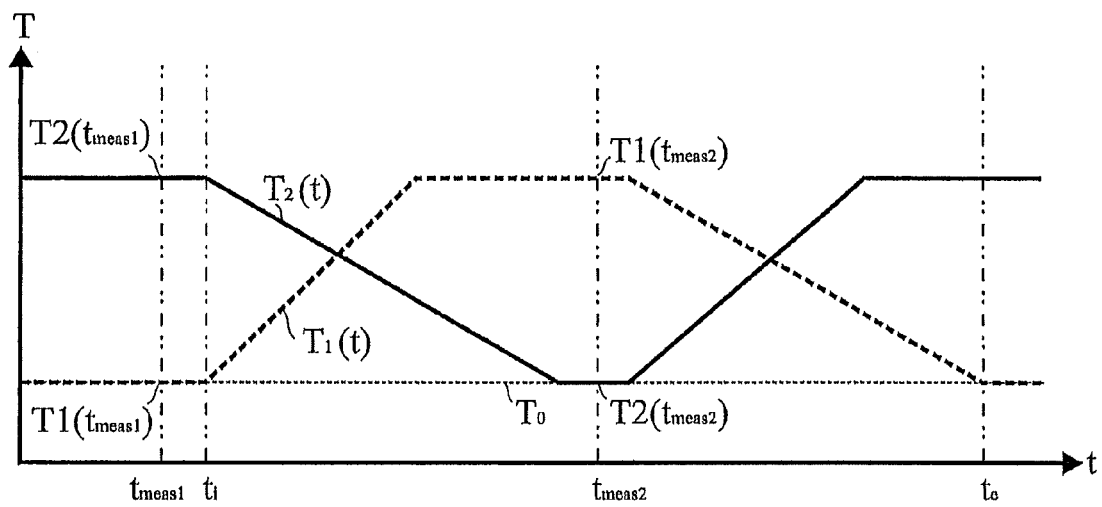
FIG. 7 illustrates a diagnosis method useful for understanding exemplary embodiments described herein.

To detect the presence of a coating, a method for diagnosis of the flowmeter in accordance with an exemplary embodiment can be carried out. FIG. 7 shows an example useful for understanding exemplary embodiments described herein. Therein, a graph similar to the graph of FIG. 5 is shown. The graph shows temperature curves $T_2(t)$ of the second sensor and $T_1(t)$ of the first sensor plotted against time t. First, the second sensor is kept at a constant over-temperature, while the first sensor is at fluid temperature $T_0$. After a measurement of the heating power $P_2(t_{meas1})$ at a first measurement time $t_{meas1}$, a first flow rate can be determined from the heating power $P_2(t_{meas1})$ and the temperatures $T_2(t_{meas1})$ and $T_1(t_{meas1})=T_0$ of the second and the first sensor, respectively, as described above. Afterwards, the roles of the sensors are interchanged. The second sensor is not further heated and cools down to the fluid temperature $T_0$ by its thermal coupling to the fluid, while the first sensor is heated to a constant over-temperature. At a second measurement time $t_{meas2}$ the heating power $P_1(t_{meas2})$ measured and a second flow rate is determined from the heating power $P_1(t_{meas2})$ and the temperatures $T_1(t_{meas2})$ and $T_2(t_{meas2})=T_0$ of the first and the second sensor, respectively, as described above. If the first flow rate and the second flow rate do not coincide, this can be taken as a sign of the presence of a coating on the second sensor. This method is referred to herein as "switching diagnostics". The interchange of the roles of the first and second sensor can take several minutes, depending on the heat capacity of the sensors.

As shown in the example of FIG. 7, a full diagnosis cycle is not complete with the measurement at the second measurement time $t_{meas2}$ since the roles of the sensors should be interchanged again. Otherwise, if normal operation resumed with the first sensor kept at the over-temperature, the first sensor may be coated in the same way that the second sensor was coated before the first interchange of the roles. If both sensors are coated substantially equally, no reliable detection of a coating may not be possible with this method. In FIG. 7, the diagnosis cycle begins at time $t_h$ when heating of the first and cooling of the second sensor starts, and ends at time $t_e$, when the second sensor reaches a constant over-temperature and the first sensor is again at fluid temperature $T_0$.

A diagnosis cycle can start when the state of at least one sensor (e.g., its temperature or heating power), is changed for diagnosis purposes as compared to the states of the sensors during normal operation (e.g., in a steady state). During normal operation, the sensors can be operated with pre-determined parameters, which are also referred to herein as normal operation parameters. The diagnosis cycle can end, when sensors revert to the state determined by the pre-determined parameters.

According to exemplary embodiments described herein, methods for diagnosis of a flowmeter are provided, such as for diagnosis of one or more sensors of the flowmeter. Therein, diagnosis may be a diagnosis with respect to a malfunctioning, failure or abnormal condition of the one or more sensors, e.g. due to coating on at least one sensor or a crack in the at least one sensor. In exemplary embodiments, methods for online diagnosis of the flowmeter, such as of at least one sensor of the flowmeter, are provided. Any of these methods will be referred to as "method for diagnosis" in the present disclosure. The term "online" as used herein signifies that normal operation of the flowmeter, i.e. the measurement of the flow rate, can continue while the "online" activity is carried out. An online diagnosis provides an advantage over the method described with respect to FIG. 7, where flow rates cannot be determined during a long time interval of the diagnosis cycle.

The term "fluid" as used herein can include gases and liquids and mixtures thereof, including gases, liquids and mixtures thereof containing small amounts or traces of solids, so long as the solids do not considerably influence the ability of the fluid to flow or stream. In exemplary embodiments, which can be combined with any of the embodiments described herein, the fluid is selected from the group of fluids including: gases, liquids, natural gas, alkanes, compressed air, nitrogen, oxygen, inert gases, helium, argon, water, petrochemical substances, oil, fuel, sewage, and mixtures thereof. The group of fluids further includes the same fluids, and mixtures thereof, further containing at least one element selected from the group of solids consisting of: soot, dust, microparticles, suspended particles, calcium carbonate, and mixtures thereof.

A first embodiment is illustrated in FIG. 1A, showing a schematic graph of temperature versus time. The graph illustrates the temperature curve $T_1(t)$ of a first sensor unit and the temperature curve $T_2(t)$ of a second sensor unit. In FIG. 1A, outside of a diagnosis cycle which starts at time $t_1$ and ends at time $t_0$, the second sensor unit can have a constant initial over-temperature. This situation is comparable to the situation explained with respect to FIG. 5. Outside of the diagnosis cycle, the flow rate of the fluid can be determined, as explained above, by determining the initial over-temperature $T_2(t<t_1)$, the heating power $P_2(t<t_1)$ applied to the second sensor unit, and the temperature $T_0$ of the fluid, and using the above formula (1) relating these quantities to the velocity v of the fluid.

At time $t_1$, the diagnosis cycle starts. The first sensor unit and the second sensor unit are simultaneously heated. As shown in FIG. 1A, the first sensor unit reaches a first constant over-temperature, which is typically lower than the initial over-temperature of the second sensor unit. The second sensor unit reaches a second constant over-temperature, which is higher than the initial over-temperature of the second sensor unit. In this embodiment, the first and second over-temperatures are controlled. For example, the actual temperatures of the first and second sensor units are monitored and compared to nominal values corresponding to a first and second over-temperature, as compared to $T_0$. Alternatively, the actual temperatures of the first and second sensor units are monitored and compared to nominal values of a fixed temperature difference $\Delta T=T_2-T_1$ and nominal values e.g. of $T_1$, which may e.g. be kept at some over-temperature $\delta T$ compared to $T_0$. If the actual values differ from the nominal values, the sensor units can be provided with increased or reduced heating power to compensate the deviation and to bring the actual temperatures in accordance with the controlled nominal first and second over-temperatures. An operating mode where the temperatures of the sensor units, or a temperature difference of the two sensors, are controlled is referred herein to as constant temperature mode. The power may be adjusted either by adjusting a constant power level or e.g. by pulse width modulation. In the latter case, the power P at a given time actually refers to the averaged power over a suitable time interval (e.g., spanning a few pulses).

The formula (1) for determining the flow rate can be generalized to $$\Delta P/\Delta T = A + B v^{1/2} \qquad (2)$$

wherein $\Delta P$ is a difference in heating power e.g. between a first sensor and a second sensor, and $\Delta T$ is an associated temperature difference. This generalization is possible because equation (1) is linear, i.e. $P_2$ is a linear function of $(T_2(t_{meas})-T_0)$ in equation (1). While there are some non-linear effects (e.g. due to natural convection), these effects have not been reflected in equation (1) because they can be considered negligible in an exemplary embodiment.

The parameters A and B, depending on the properties of the fluid, and v, the velocity of the fluid, are the same as before, if the sensors are identical. The property that a power difference is proportional to an associated temperature difference opens up the new possibility of determining the flow rate from temperature and power values of sensor units whose temperatures both differ from each other and from the temperature of the fluid.

In the exemplary embodiment illustrated in FIG. 1A, at time $t_{meas}$, the constant first and second over-temperature are simultaneously determined as temperatures TM1 and TM2, and the corresponding powers PM1 and PM2 applied to the sensor units are measured. The flow rate can be determined from a first thermal conductance $(\Delta P/\Delta T)_1=(PM2-PM1)/(TM1-TM2)=A+B\ v^{1/2}$. In the embodiment illustrated by FIG. 1A, the first and second sensor units are heated during the diagnosis cycle such that the temperature difference $T_2(t)-T_1(t)$ is a constant $\Delta T$ at all times and equal to the constant temperature difference $\Delta T$ outside of the diagnosis cycle. The flow rate can therefore directly be inferred from the power difference $P_2(t)-P_1(t)$ at all times.

Further, according to the exemplary embodiment described with respect to FIG. 1A, a diagnosis value can be determined from the values TM1, TM2, PM1, PM2 and a the temperature value TM0 of the fluid. The temperature $T_0$ of the fluid may be measured by a third sensor unit at the measurement time $t_{meas}$, or, if no third sensor unit is present, be taken as the last temperature value measured by the first sensor unit before the start of the diagnosis cycle at time Since the temperature of the fluid usually does not fluctuate as fast as the flow rate, the assumption that the so-measured temperature value TM0 substantially equals the actual temperature value at time $t_{meas}$ can be justified. A test may be carried out by measuring the temperature of the fluid again after the end of the diagnosis cycle when the first sensor unit is again in thermal equilibrium with the fluid.

The diagnosis value can be determined by computing a second thermal conductance $(\Delta P/\Delta T)_2=PM1/(TM1-TM0)$, wherein TM1−TM0=$\delta T$, and by computing the quotient of the first and the second thermal conductance. The diagnosis value is given by this quotient and should be one, if the first and the second sensor have identical thermal properties. Typically, if the diagnosis value is not one, the thermal properties of the sensors, such as the heat transfer, are different, and this may be taken as an indicator that one of the sensors may malfunction or be more coated than the other. Alternatively, the diagnosis value can be computed as the difference of the thermal conductances, where a deviation from zero is then the relevant indicator. The diagnosis value can be computed even if the properties of the fluid, reflected in the values A and B, are unknown (e.g., even in the case that the flow rate cannot be determined by the above formula (2)).

Figure 1B:
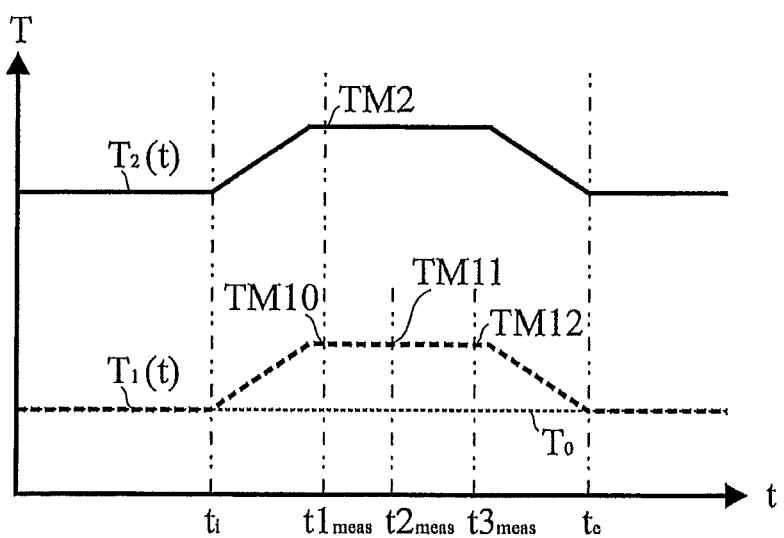
Figure 1C:
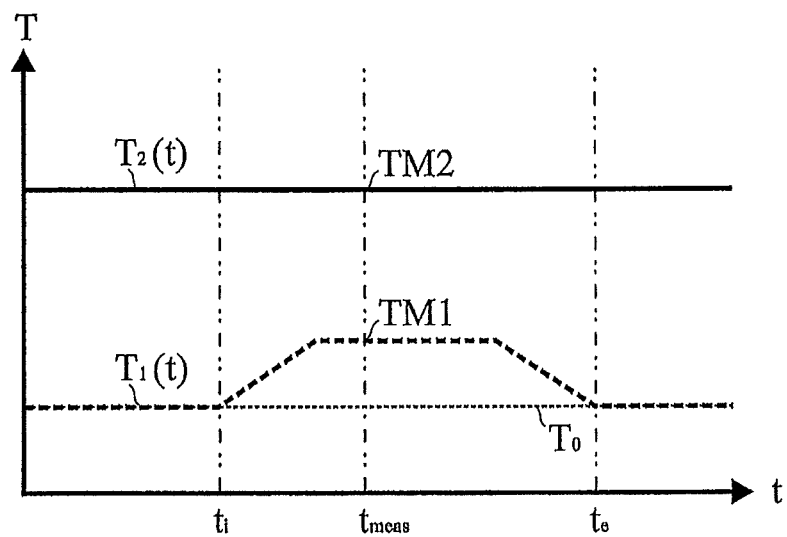
Figure 1D:
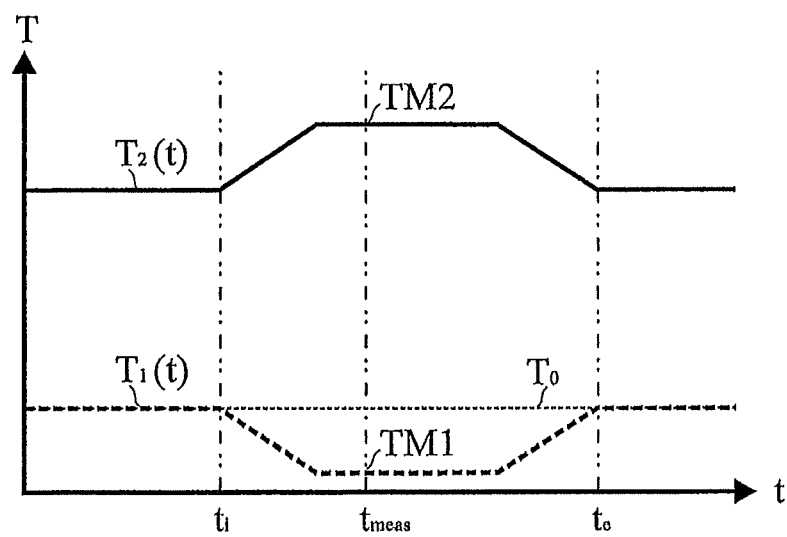
Figure 1E:
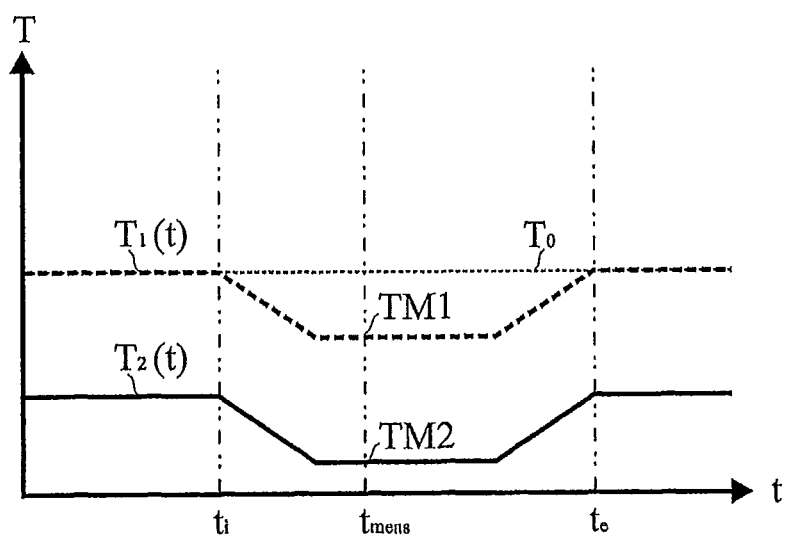
Figure 2:
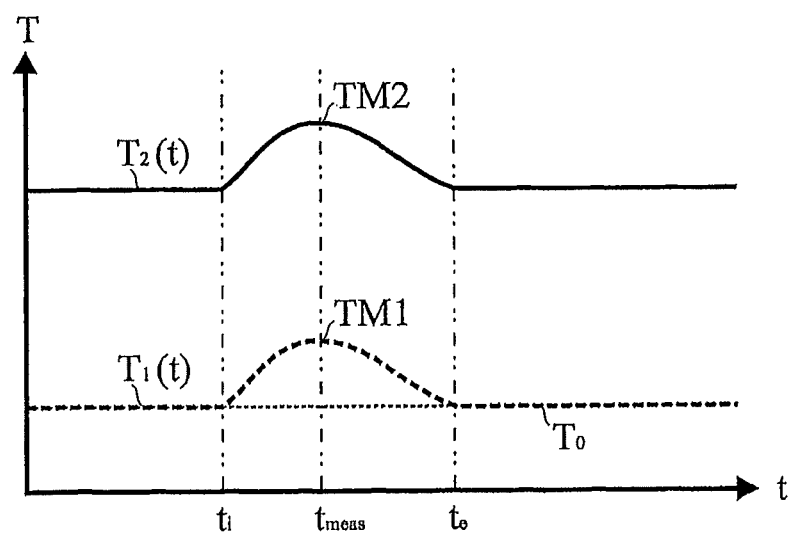
FIG. 2 shows a schematic graph of temperature versus time illustrating methods for diagnosis of at least one sensor unit in accordance with exemplary embodiments described herein.

FIGS. 1B to 1E show additional diagnosis methods in accordance with further exemplary embodiments. In FIG. 1B, measurements at least of the functions $T_1$ and $P_1$ are made at times $t1_{meas}, t2_{meas}, t3_{meas}$, yielding values T10, T11 and T12, such that errors in single measurements can be compensated, e.g. by a suitable statistical value such as the average value thereof. In FIG. 1C, the second sensor unit is kept at the constant initial over-temperature relative to $T_0$ at all times, thus avoiding a higher over-temperature during the diagnosis cycle. In FIG. 1C, the temperature of the first sensor unit is different from the temperature of the second sensor unit. In other embodiments, the temperature of the first sensor unit may also be identical with the temperature of the second sensor unit at least during a part of the diagnosis cycle. In FIG. 1D, the first sensor unit is cooled to an under-temperature instead of an over-temperature. The increased temperature difference may improve the precision of the measurements. In FIG. 1E, both sensors are cooled to an under-temperature, i.e., a lower temperature than the temperature of the fluid is used on both sensors for the measurements. Such a setup may be advantageous (e.g., in hot streams of gases} where it can be more convenient to cool the sensors instead of heating them. FIG. 2 shows a further exemplary embodiment, where the sensors are heated with non-constant power, but for example still keeping a constant relative temperature difference ΔT and where the diagnosis cycle can be shortened to substantially not include a steady state phase but only a transient phase. The embodiments illustrated in FIGS. 1B to 1E and FIG. 2 will be described later.

According to exemplary embodiments described herein, a method for diagnosis of at least one sensor unit of the flowmeter can include thermally coupling a first sensor unit of the flowmeter to the fluid and thermally coupling a second sensor unit of the flowmeter to the fluid. Thermal coupling of the sensors can include immersion of at least part of the sensors into a flow of the fluid. Thermal coupling of the sensors may include heat exchange of the sensors with the fluid (e.g., by heating or cooling by forced convection).

In exemplary embodiments, which can be combined with any of the embodiments described herein, the method for diagnosis can include determining a temperature $T_0$ of the fluid. In accordance with exemplary embodiments, the temperature $T_0$ of the fluid may vary. However, the temperature $T_0$ of the fluid can be constant or nearly constant, at least during a diagnosis cycle. The temperature $T_0$ can be determined by the first sensor unit and/or by the second sensor unit. Therein, the temperature can be determined before and/or after a diagnosis cycle. In exemplary embodiments the method can include discarding or correcting a diagnosis result if the fluid temperature before the diagnosis cycle differs from the fluid temperature after the diagnosis cycle. A diagnosis method utilizing only two sensors can keep the flowmeter simple and the production and operation costs low.

Alternatively, the temperature of the fluid can be determined during a diagnosis cycle and/or be continuously monitored (e.g., by a third sensor unit). The third sensor unit is thermally coupled to the fluid. The third sensor can be unheated and/or not actively cooled. The third sensor is typically in thermal equilibrium with the fluid. The third sensor can be integrated into the flowmeter. The integrated design can allow for an exemplary flowmeter to be used as a plug-in solution. The third sensor unit can alternatively be provided externally to the flowmeter. An externally provided third sensor unit can for example be of a different type, such as an uncalibrated sensor for detecting changes in the fluid temperature. In exemplary embodiments, the method can include discarding or correcting a diagnosis result if the fluid temperature, determined by the third sensor unit, changes.

According to exemplary embodiments described herein, the method can include heating the first sensor unit and simultaneously heating the second sensor unit. Starting the simultaneous heating of the first and second sensor unit can mark the beginning of a diagnosis cycle. The first sensor unit may be heated by applying power to the first sensor unit. The second sensor unit may be heated by applying power to the second sensor unit. In exemplary embodiments, which can be combined with any of the embodiments described herein, power is applied such that the temperatures of the first and second sensor unit are different from each other, and for example also different from the temperature $T_0$ of the fluid. Power can for example be applied via a thermal control unit. Simultaneous heating can be controlled by at least one control algorithm stored on a non-transitory computer-readable recording medium (e.g., one or two control algorithms carried out in the thermal control unit).

In accordance with exemplary embodiments, the first sensor unit can be heated such that the first sensor unit has a first over-temperature. The second sensor unit can be heated such that the second sensor unit has a second over-temperature, typically being higher than the first over-temperature. The second over-temperature can be kept constant with respect to $T_0$. Alternatively it can also be controlled such that it remains constant relative to $T_1$, so that the same control algorithm can be used in this case as in the normal flow measurement.

In exemplary embodiments, heating the first sensor unit can include heating the first sensor unit such that it reaches a constant first over-temperature, and simultaneously heating the second sensor unit can include heating the second sensor unit such that it reaches a constant second over-temperature different form the first over-temperature. Constant over-temperatures reached during a diagnosis cycle can be different from initial constant over-temperatures which one of the sensors has outside of a diagnosis cycle. If the first and second sensor unit reach constant over-temperatures, (e.g., during a diagnosis cycle), the time interval during which they maintain their respective constant over-temperatures is referred to herein as a steady phase. Time intervals during which at least one of the sensors changes its temperature are referred to herein as a transient phase.

According to exemplary embodiments described herein, the method for diagnosis can include determining a temperature TM1 of the first sensor unit and a power PM1 applied to the first sensor unit, and simultaneously determining a temperature TM2 of the second sensor unit and a power PM2 applied to the second sensor unit. Herein, "simultaneously determining" refers to determining information about said values at equal times. The temperature T1 and the power P1 may be measured at a time $t_{meas}$, such that $TM1=T_1(t_{meas})$ and $PM1=P_1(t_{meas})$, and the temperature TM2 and power PM2 are measured simultaneously, such that $TM2=T_2(t_{meas})$ and $PM2=P_2(t_{meas})$.

In the exemplary switching diagnostics described with respect to FIG. 7, the measured values for determining the two flow rates to be compared for the diagnosis can be measured at different times, which may be separated by several minutes. In other words, flow measurements can be compared at different times. For the diagnosis result of the switching diagnostics to be meaningful, the flow rate of the fluid should be constant within the desired accuracy (e.g., a few percent), during the whole diagnosis cycle. Since the diagnosis cycle may take several minutes, this assumption is not always justified, leading to wrong diagnosis results. In the exemplary embodiments described herein, on the other hand, the relevant values for diagnosis can be measured simultaneously. The diagnosis according to embodiments described herein may be more stable and/or more accurate. The reference temperature $T_0$ of the fluid can vary much less over the diagnosis cycle as compared to the flow rate of the fluid. The diagnosis cycle can be much shorter than in the switching diagnostics of FIG. 7.

In exemplary embodiments, which can be combined with any of the embodiments described herein, the temperature of the first sensor unit can be different from the temperature of the second sensor unit at all times at least during the diagnosis cycle. For example, the temperatures of the first and second sensor unit may not cross each other. The temperatures of the first and second sensor unit can maintain a minimum separation, in exemplary embodiments a constant separation. An exemplary advantage of a constant separation can be that the flow rate measurement is not disturbed by the ongoing diagnosis (e.g., both can be carried out simultaneously). In addition, a flow measurement can also be done during the heating-up or cooling-down time interval of the diagnosis cycle.

Heating the sensor units and determining the temperatures TM1 and TM2 and the applied powers PM1 and PM2 may be carried out according to different modes, e.g. a constant power mode or a constant temperature mode. In exemplary embodiments, referred to herein as constant temperature mode, the first and the second sensor units can be heated to pre-determined, controlled temperatures. The pre-determined, controlled temperatures can then be determined as temperatures TM1 and TM2, respectively. The corresponding powers PM1 and PM2 applied to the first sensor unit and the second sensor unit, respectively, can be measured.

In exemplary embodiments, controlling a quantity such as temperature or power shall mean monitoring this quantity, comparing the actual measured value of this quantity to a pre-determined value, and, if the actual measured value differs from the pre-determined value, taking actions to eliminate this difference. For example, if the temperature of a sensor unit is controlled, then the heating power is increased when the actual temperature of the sensor unit is below the pre-determined value, and diminished when the actual temperature of the sensor unit is above the pre-determined value. Determining the value of a controlled quantity need not involve extra efforts since, for carrying out controlling, this quantity is already measured.

In exemplary embodiments, a temperature difference between the first and the second sensor unit existing before the diagnosis cycle can be maintained throughout the diagnosis cycle, or at least throughout a steady phase of the diagnosis cycle. Let $\Delta T$ be this difference between an initial over-temperature of the second sensor and the initial temperature of the first sensor unit which, for example, equals the temperature $T_0$ of the fluid. The first sensor may be heated from its initial temperature $T_0$ to an over-temperature $T_0+\delta T$. Simultaneously, the second sensor may be heated from its initial over-temperature to the temperature $T_0+\Delta T+\delta T$. In exemplary embodiments, the temperature difference $\delta T$ can be smaller than the temperature difference $\Delta T$, as e.g. shown in FIG. 1A.

In exemplary embodiments, referred to as constant power mode, the first and the second sensor units can be heated by pre-determined, controlled powers. The pre-determined controlled powers can be determined as powers PM1 and PM2, respectively. While the pre-determined, controlled powers are applied to the sensor units, the temperatures TM1 and TM2 can be measured, e.g. at the measurement time $t_{meas}$. For example, let $\Delta P$ be the difference between an initial heating power of the second sensor and an initial heating power of the first sensor unit, the latter being equal to zero. The first sensor may be heated by a constant heating power $\delta P$. Simultaneously, the second sensor may be heated by a constant heating power $\Delta P+\delta P$. The use of a constant-power mode is an advantage for applications in explosive environments. Here, the maximal power allowed to be applied to the sensors may be limited.

Embodiments implementing the constant power mode or the constant temperature mode can be combined with any of the embodiments described herein. For example, the over-temperature of the second sensor $T_2$ may be controlled to have a constant over-temperature $\Delta T$ compared to the temperature of the first sensor $T_1$, whereas the first sensor may be heated with a constant power $\delta P$.

From the determined values TM1, TM2, PM1, PM2 and the temperature TM0 of the fluid, the diagnosis value can be determined. The diagnosis value may for example indicate a coating of at least one of the sensors. The diagnosis value is determined, according to exemplary embodiments, by computing the first thermal conductance $(\Delta P/\Delta T)_1=(PM2-PM1)/(TM2-TM1)$ and the second thermal conductance $(\Delta P/\Delta T)_2=PM1/(TM1-TM0)$. The diagnosis value, given by for example the ratio of the first and the second thermal conductance, should be one or substantially one, if the first and the second sensor have identical thermal properties. This follows from formula (2). As explained above, if the diagnosis value is not substantially one, the thermal properties of the sensors such as heat conductivity can be different, and this may be taken as an indicator that one of the sensors may malfunction or be more coated than the other.

Determining the diagnosis value as the ratio of thermal conductances has the advantage that the properties of the fluid need not be known. Hence, diagnosis can even work in the case that a flow rate cannot be determined from formula (1) or (2) because the parameters A and B are unknown. In exemplary embodiments, the parameters A and B can be known, and the diagnosis value may be determined from the ratio of the velocities or flow rates derived from the thermal conductances. In exemplary embodiments, the diagnosis value and the flow rate can be determined simultaneously. Formula (2) is an example for relating the flow rate of the fluid to other quantities such as the thermal conductance, the applied power, the temperature of at least one sensor etc. Such quantities are referred to herein as heat transfer related quantities. Heat transfer is to be understood as an exchange of heat between at least one sensor and the fluid.

According to exemplary embodiments which can be combined with any of the embodiments described herein, the method for diagnosis can include determining at least two independent quantities related to the heat transfer of the sensor units. Each of the at least two independent heat transfer related quantities may be determined from at least one element selected from the group comprising TM0, TM1, TM2, PM1, and PM2. Therein, a heat transfer related quantity can be said to be dependent on another heat transfer related quantity if the quantity is determined from the same selection of elements from said group (i.e. of TM0, TM1, TM2, PM1, and P2) and if it is determined using the same algorithm (wherein, for example, a mere multiplication by an overall factor is considered as not causing the algorithm to be different). For instance, two heat transfer related quantities are dependent on one another if one is simply twice the other. Accordingly, two heat transfer related quantities are independent if they are not dependent.

A heat transfer related quantity can be independent of another heat transfer related quantity if it is determined from a selection of elements from said group different from the selection from which the other heat transfer related quantity is determined. It may happen that two independent heat transfer related quantities are determined from the same selection from said group, but in different ways (for example, by a different algorithm). For instance, a first heat transfer related quantity may be determined at least from the temperature TM2. A second heat transfer related quantity may for example be determined at least from the temperature TM1. Therein, the first heat transfer related quantity may be determined from the temperatures TM1 and TM2 and from the applied powers PM1 and PM2. The second heat transfer related quantity may be determined from the temperatures TM1 and TM0 and from the applied power P1. The first and/or second heat transfer related quantity can be, for example, selected from the group comprising (e.g., consisting of): flow rate of the fluid, velocity of the fluid, thermal conductance of the sensor or the sensors. In exemplary embodiments, at least a third independent heat transfer related quantity may be determined, e.g. from the temperatures TM2 and TM0 and the power PM2.

The first heat transfer related quantity may be computed as $(\Delta P/\Delta T)_1 = (PM2-PM1)/(TM2-TM1)$. The second heat transfer related quantity may be computed as $(\Delta P/\Delta T)_2 = PM1/(TM1-TM0)$. The third heat transfer related quantity may be computed as $(\Delta P/\Delta T)_3 = PM2/(TM2-TM0)$. In exemplary embodiments, the flowmeter can include the first and second sensor unit, but no third sensor unit. Then, the value of the temperature function $T_0$ is not available at the measurement time $t_{meas}$, when the flowmeter values TM1, TM2, PM1, PM2 are determined. In exemplary embodiments, the value TM0 of $T_0$ immediately before the start of the diagnosis cycle can be taken for computing the second heat transfer related quantity. If the first heat transfer related quantity is computed as (PM2−PM1)/(TM2−TM1) then, independent of whether the temperature of the fluid is constant or varies, a determination of the flow rate from the first heat transfer related quantity can be valid and independent of a variation in the temperature of the fluid. If the temperature of the fluid is not substantially constant at least during the diagnosis cycle, the second heat transfer related quantity and/or a second flow rate derived therefrom may be flawed. A diagnosis result as described below may then indicate a problem with at least one of the sensors although the sensors might operate within allowed error tolerances. This situation can be ruled out by a second determination of the temperature of the fluid after the diagnosis cycle and/or by evaluating the diagnosis results of at least two diagnosis cycles. In exemplary applications, the temperature $T_0$ of the fluid can be constant or varies slowly as compared to the duration of a diagnosis cycle.

In exemplary embodiments which can be combined with any of the embodiments described herein, the method for diagnosis can include determining a diagnosis result by setting into relation the first heat transfer related quantity and the second heat transfer related quantity. The relation may be the ratio. The method may include determining the diagnosis result from the ratio, between the first heat transfer related quantity and the second heat transfer related quantity. In exemplary embodiments, the first and second heat transfer related quantities have the same physical dimensions. The ratio can be dimensionless. A dimensionless ratio that is not equal to one can be taken as an indicator for a faulty condition of at least one of the sensor units.

In exemplary embodiments, which can be combined with any of the embodiments described herein, the determined diagnosis result can be indicative of at least one condition selected from the group consisting of: a coating on the first sensor unit, a coating on the second sensor unit, an abrasion of material on the first sensor unit, an abrasion of material on the second sensor unit, a malfunction of the first sensor unit, a malfunction of the second sensor unit, a miscalibration of the first sensor unit, and a miscalibration of the second sensor unit. The determined diagnosis result may be a measure of at least one of the properties selected from the group comprising (e.g., consisting of): a thickness of a coating, thermal properties of a coating, an amount of abrasion of material, cracks or discontinuities in the sensor, a severity of a malfunction, and a severity of a miscalibration.

According to exemplary embodiments, which can be combined with any of the embodiments described herein, a method for diagnosis of at least one sensor of the flowmeter and/or for measurement of the flow rate of the fluid are provided. According to exemplary embodiments, which can be combined with any of the embodiments described herein, a method for online diagnosis of at least one sensor of the flowmeter and for simultaneous measurement of the flow rate of the fluid are provided. The method can include simultaneously determining the diagnosis result and a flow rate of the fluid, for example from the first and/or second heat transfer related quantity. The method for diagnosis may include continuously and/or repeatedly determining the flow rate. In this embodiment, "repeatedly determining the flow rate" means determining the flow rate at several times (which can be arbitrary), and "continuously determining the flow rate" means determining the flow rate at times separated by a pre-determined repetition time interval.

Further, according to exemplary embodiments, which can be combined with any of the embodiments described herein, the method for diagnosis can include determining the value of the temperature $T_0$ of the fluid a second time, (e.g., after a first diagnosis cycle). The method for diagnosis may include checking validity of the diagnosis result using the second determination of the temperature $T_0$. In exemplary embodiments, several, i.e. at least two, diagnosis cycles may be carried out. The second and/or any further diagnosis cycle may include the same steps as the first diagnosis cycle according to the embodiments described herein. The method may include determining at least one second diagnosis result and performing statistical analysis with respect to the diagnosis result and the at least one second diagnosis result (e.g., by averaging or majority voting).

As, for example shown in FIG. 1A, the temperature curve $T_2(t)$ can revert to the initial over-temperature from the second over-temperature. Likewise, temperature curve $T_1(t)$ can revert to the initial temperature equal to the temperature of the fluid from the first over-temperature. The time $t_e$ when both temperature curves have reverted to the initial over-temperature and temperature of the fluid, respectively, marks the end of the diagnosis cycle. For example, for reverting to the initial temperatures, the heating power applied to the first sensor unit may be shut off and forced convection cools the first sensor unit to fluid temperature. Likewise, depending on whether the flowmeter is operated in constant power mode or constant temperature mode, the second heating power can be set to an initial value or the temperature is controlled to maintain its initial value. The latter case is shown in FIG. 1A. Reverting to the initial temperatures or initial powers is referred to herein as reverse cooling.

In exemplary embodiments, which can be combined with any of the embodiments described herein, the method for diagnosis can include reverse cooling of the first sensor. Similarly, the second sensor can be reversely cooled. In exemplary embodiments, reverse cooling of the first sensor can take place simultaneously with reverse cooling of the second sensor. Reverse cooling may include active reverse cooling. Active reverse cooling can, for example, shorten the diagnosis cycle. Active cooling includes cooling by applying a cooling power. Cooling that is solely effected by a coupling to the fluid is not considered active cooling.

In exemplary embodiments, which can be combined with any of the embodiments described herein, the first sensor unit and the second sensor unit are thermally identical. As used herein, the term "thermally identical" shall signify that their thermal properties are identical, or substantially identical, at least when the sensor units are new. In exemplary embodiments, the first and the second sensor unit are of the same model. As used herein, "same model" shall signify that they are identical up to manufacturing tolerances. Same model sensor units are regarded as thermally identical. Flowmeters with sensor units of the same model can be simple, easy to control, and/or cheaper than flowmeters with sensor units differing in their model. Thermally identical sensors can differ from each other, e.g. in form, size, and material. Thermally identical, but not same model sensor units may end up being coated differently, even when operated at the same temperature and/or when submitted to the same flow of the fluid. Thereby, detection of a coating or correction of the measured flow rate in the flowmeter can be better detected and sometimes even corrected.

If the first and the second sensor unit are thermally identical, applying some heating power will heat them to the same steady state temperature, unless the thermal properties are actually different because of a coating or malfunction, in which case one of them may be cooled to a lesser extent by the fluid. Applying the same power difference will heat them by the same temperature difference unless one of them is coated differently or malfunctions. This relation is reflected in formula (2) and follows from the linearity of the equations of heat conduction, apart from a contribution by natural convection, which is usually negligible unless the flow rates are very low. Exemplary embodiments can allow simultaneously determining the temperatures TM1 and TM2 and associated powers PM1 and PM2 during a transient phase in the diagnosis cycle.

According to exemplary embodiments which can be combined with any of the embodiments described herein, the method includes calibrating the first sensor unit and/or the second sensor unit. Therein, calibration can be carried out with the first sensor unit and/or the second sensor unit being new (for example, as manufactured and before taking up their normal operation). The method can include generating calibration data for the first and/or the second sensor unit. Using calibration data can, for instance, compensate errors in the diagnosis or flow rate measurement which are due to the first and second sensor unit not being of the same model or being thermally non-identical.

In accordance with exemplary embodiments, determining the powers PM1, PM2 and the temperatures TM1 and TM2 may take place during a steady phase or during a transient phase. In exemplary embodiments, these powers and temperatures can be determined during a steady phase in the diagnosis cycle, as for example shown in FIG. 1A. In other exemplary embodiments, the temperature TM1 of the first sensor unit and the power PM1 applied to the first sensor unit, and the temperature TM2 of the second sensor unit and the power PM2 applied to the second sensor unit are simultaneously determined during a transient phase and/or during a steady phase.

In FIG. 1A, embodiments of the method for diagnosis in the constant temperature mode with thermally identical first and second sensor units are illustrated. The transient phases in the diagnosis cycle are considered the ramp parts of the curves $T_1(t)$ and $T_2(t)$, while the steady phase is considered the flat part at constant first and second over-temperatures. In FIG. 1A, the flowmeter values TM1, TM2, PM1, PM2 are determined at a time $t_{meas}$ during the steady phase. In other embodiments, the time $t_{meas}$ lies in the transient phase, and the flowmeter values TM1, TM2, PM1, PM2 are determined during the transient phase. The flowmeter values TM1, TM2, PM1, PM2 may be determined at any time in the diagnostic cycle according to exemplary embodiments FIG. 1B shows a similar graph as FIG. 1A. In FIG. 1B, the flowmeter values $T_1$ and $P_1$ are determined several times during the steady phase. Since the temperature difference between the temperature of the fluid $T_0$ and the first over-temperature is smaller than the temperature difference between second over-temperature and the first over-temperature in FIG. 1B, the thermal conductance or flow rate or other second heat transfer related quantity, computed as PM1/(TM1−TM0), can be determined less accurately than the corresponding second heat transfer related quantity, computed as (PM2−PM1)/(TM2−TM1). As used herein, "less accurate" refers to the property that measurement errors may flaw the quotient of two smaller numbers to a larger degree than the quotient of two larger numbers. In FIG. 1B, measurement of the values of the functions $P_1$ and $T_1$ for determining the second heat transfer related quantity, namely the thermal conductance, is repeated at three different times $t1_{meas}$, $t2_{meas}$, $t3_{meas}$ during the diagnosis cycle, yielding values T10, P10, T11, P11, T12, P12. Averaging the result (e.g., T1=(T10+T11+T12)/3 and P1=(P10+P11+P12)/3), or performing other statistical operations can improve the accuracy of the statistical second heat transfer related quantity. Also, determination of the first heat transfer related quantity may be repeated simultaneously by measurements of the function values of $P_2$ and $T_2$ at the times $t1_{meas}$, $t2_{meas}$, $t3_{meas}$. In exemplary embodiments, the simultaneous determination of one, several or all of the values TM1, TM2, PM1, PM2 may be repeated at least twice (e.g., twice, three times, four times or more than four times). Statistical analysis of several such measurement results can be simple if the measurement results are determined during the steady phase of the diagnosis cycle.

According to exemplary embodiments which can be combined with any of the embodiments described herein, the method for diagnosis can include at least one of the following: at least twofold determination of the temperature of the first sensor unit and the power applied to the first sensor unit yielding values $T_1(t_1)$, $P_1(t_1)$, $T_1(t_2)$, $P_1(t_2)$; at least twofold determination of the temperature of the second sensor unit and the power applied to the second sensor unit yielding values $T_2(t_1)$, $P_2(t_1)$, $T_2(t_2)$, $P_2(t_2)$, and simultaneous at least twofold determination of the temperature of the first sensor unit, the power applied to the first sensor unit, the temperature of the second sensor unit and the power applied to the second sensor unit yielding values $T_1(t_1)$, $P_1(t_1)$, $T_2(t_1)$, $P_2(t_1)$, $T_1(t_2)$, $P_1(t_2)$, $T_2(t_2)$, $P_2(t_2)$. The method can further include determining a first statistical heat transfer related quantity at least from the temperatures $T_2(t_1)$ and $T_2(t_2)$, and determining a second statistical heat transfer related quantity at least from the temperatures $T_1(t_1)$ and $T_1(t_2)$. The method can include determining a diagnosis result by setting into relation the first statistical heat transfer related quantity and the second statistical heat transfer related quantity.

FIG. 1C shows a further graph similar as in FIGS. 1A and 1B, illustrating further embodiments of the method for diagnosis. Therein, the second sensor unit is kept at a constant initial over-temperature before, during and after the diagnosis cycle. The first sensor unit is heated to a first over-temperature in the diagnosis cycle. According to exemplary embodiments of the method for diagnosis run in constant power mode, the second sensor unit is heated by a constant heating power before, during, and after the diagnosis cycle. The first sensor unit is heated by constant heating power in the first diagnosis cycle, reaching a certain constant over-temperature. Measurements and evaluations are similar to other embodiments described herein, for example as described with respect to FIGS. 1A and 1B. Here, only the first sensor unit runs through, and defines, the diagnosis cycle, thereby simplifying a control algorithm.

FIG. 1D shows a further graph similar as in FIGS. 1A to 1C, illustrating further exemplary embodiments of the method for diagnosis. Therein, the first sensor unit is actively cooled to an under-temperature instead of to the first over-temperature during the diagnosis cycle. This embodiment illustrates that instead of simultaneously heating both sensor units, one of the sensor units may be actively cooled instead. In yet further embodiments, as shown in FIG. 1E, both sensors may be actively cooled. Since the quotient $\Delta P/\Delta T$ is typically positive, absolute values may be taken when processing the measurement values.

According to exemplary embodiments which can be combined with any of the embodiments described herein, "heating", meaning actively heating by applying a heating power, and "heating to an over-temperature" can be replaced by "actively cooling" and "cooling to an under-temperature". A sensor cooled by forced convection due to its thermal coupling to the fluid is not said to be actively cooled. In exemplary embodiments, one of the first and second sensor units can be actively cooled by applying a cooling power to it, while the other is simultaneously heated. In yet other exemplary embodiments, the first and the second sensor units are simultaneously cooled. Similarly, in embodiments including reverse cooling, a sensor unit which was cooled before can be reversely heated instead of reversely cooled. Reverse heating may be active heating and/or heating by thermal coupling to the fluid.

The means by which the first and second sensor units are simultaneously heated in the transient phase can vary. In exemplary embodiments, the first and second sensor units are heated with constant, optimally equal, heating power (e.g., maximum heating power). In other exemplary embodiments, the first and second sensor units are simultaneously heated with variable, optimally equal, heating power. FIG. 2 illustrates embodiments, in which the first sensor unit and second sensor unit are heated with variable heating power. Also, there is no or substantially no steady phase in the diagnosis cycle in FIG. 2. As used herein, substantially no steady phase means that the temperature gradient may be zero in the graph at some point or in some time interval that is very small as compared to the length of the diagnosis cycle. In FIG. 2, the determination of the temperatures TM1, TM2 and applied powers PM1, PM2 is carried out at the maximum of the temperature curves in the diagnosis cycle. The diagnosis cycle can be made very short if the length of the steady phase is reduced, or if the steady phase is substantially absent or absent.

According to exemplary embodiments which can be combined with any of the embodiments described herein, heating or actively cooling the first sensor unit and simultaneously heating or actively cooling the second sensor unit can include at least one of the following steps selected from the group consisting of: applying a time varying power or temperature at least to one of the sensor unit, applying a modulated, e.g. harmonic modulated, power to the second sensor unit, and applying a modulated, typically harmonic modulated, power to the first sensor unit. Therein, according to the constant temperature mode or the constant power mode, either the modulated power is controlled ("AC power") or a modulated temperature is controlled ("AC temperature"). The modulated power can be applied in addition to either the constant heating power ("DC power") in the constant power mode or the modulated temperature is applied in addition to the constant over-temperature in the constant temperature mode.

Exemplary methods for diagnosis can include determining a modulated temperature $T_{AC}$ and a modulated power $P_{AC}$. The modulated power $P_{AC}$ and the modulated temperature $T_{AC}$ may be determined as the first temperature TM1 and power PM1 or the second temperature TM2 and power PM2. Alternatively, the modulated power $P_{AC}$ and temperature $T_{AC}$ can be determined in an additional method step.

Further, the exemplary methods for diagnosis can include determining at least one time-dependent heat-transfer related quantity and/or a modulated thermal conductance $P_{AC}/T_{AC}$ ("AC heat conductance"). Therein, the modulated thermal conductance may be determined as the first and/or second heat transfer related quantity. Alternatively, the modulated thermal conductance $P_{AC}/T_{AC}$ may be determined in an additional method step. The method for diagnosis can include determining an unmodulated thermal conductance $P_{DC}/T_{DC}$ ("DC heat conductance"). Therein, the unmodulated thermal conductance may be determined as the first and/or second heat transfer related quantity. Alternatively, the unmodulated thermal conductance $P_{DC}/T_{DC}$ may be determined in an additional method step.

Determining the diagnosis result can include, according to exemplary embodiments, setting into relation the modulated and the unmodulated thermal conductance. As an example, the relation is the ratio of the modulated and the unmodulated thermal conductance, or the inverse thereof. The method may further include comparing the determined modulated and/or unmodulated heat conductances with historical data or with a physical model. Determining the time-dependent heat transfer related quantity (e.g., a modulated thermal conductance), may include calculating a characteristic time or characteristic times needed to heat or cool a sensor unit. Determining the diagnosis result may include using the characteristic time or the characteristic times.

From the diagnosis result determined as the ratio of the modulated and unmodulated heat conductance, coatings can be detected even in the case when both sensor units are symmetrically coated (for example, have the same thermal properties). Comparison with historical data or a physical model the deposition and build-up can be detected. The detection of a coating is more sensitive with respect to a change of the heat capacity than with respect to a change of the heat conductivity. The method can include using different material classes for relating the two quantities and for predicting the error produced by the coating. The above method steps shall be referred to as "AC diagnostics" and can be combined with any of the embodiments described herein.

In exemplary embodiments, which can be combined with any of the embodiments described herein, the method for diagnosis includes at least one of the steps selected from a group consisting of: comparing the diagnosis result with a fixed tolerance range, indicating the presence of an error if the diagnosis result is outside of the fixed tolerance range, replacing the first and/or second sensor unit if the diagnosis result is outside of the fixed tolerance range, and compensating an error by adjusting determined values such as the flow rate if the diagnosis result is outside of the fixed tolerance range (e.g., by taking into account a detected coating, its thickness and/or its thermal properties in a variable model of the thermal properties of the first and/or second sensor unit).

According to exemplary embodiments, a device for flow rate measurement of a fluid and for diagnosis of at least one of a first sensor unit and a second sensor unit is provided (e.g., a flowmeter). The flowmeter includes the first sensor unit configured to be thermally coupled to the fluid, the second sensor unit configured to be thermally coupled to the fluid, a thermal control unit and an evaluation unit. The thermal control unit and the evaluation unit may be separate entities or may be integrated as one entity. The flowmeter can be configured to carry out the method of diagnosis in accordance with any of the embodiments described herein.

Figure 3A:
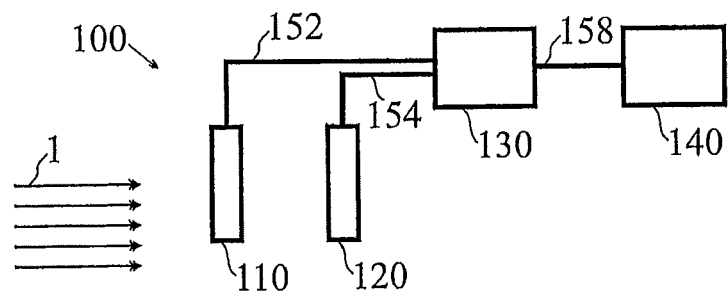
FIGS. 3A-3C show flowmeters in accordance with exemplary embodiments described herein.

A flowmeter 100 according to embodiments described herein is shown in FIG. 3A. The flowmeter can be configured to carry out the method of measuring the flow rate described with respect to FIG. 5. The flowmeter includes a first sensor unit 110, operatively connected to thermal control unit 130 via a connection 152, a second sensor unit 120 operatively connected to the thermal control unit 130 via a connection 154, where the thermal control unit 130 is operatively connected to the evaluation unit 140 by a connection 158. Further, in FIG. 3A, the flow of the fluid 1 is indicated by arrows. The sensors 110, 120 are thermally coupled to the flow of the fluid 1 and can be cooled by forced convection. In exemplary embodiments, the flow of the fluid 1 can flow along any direction and/or can change direction. The roles of the first and second sensor unit can be interchanged.

In exemplary embodiments described herein, the thermal control unit is configured to apply power to the first sensor unit and to apply power to the second sensor unit for simultaneously and individually heating or cooling the first sensor unit and the second sensor unit such that their temperatures are different from a temperature $T_0$ of the fluid and different from one another. As used herein, "individually heating/cooling" means that the application of heating/cooling power is controlled independently, so that different heating/cooling powers are applied to the sensor units as a function of time (this does not exclude that at some times the powers could be the same, e.g., by coincidence). For instance, in FIG. 3A, the thermal control unit 130 can apply power to the first sensor unit 110 via connection 152, and to the second sensor unit 120 via connection 154.

Figure 3B:
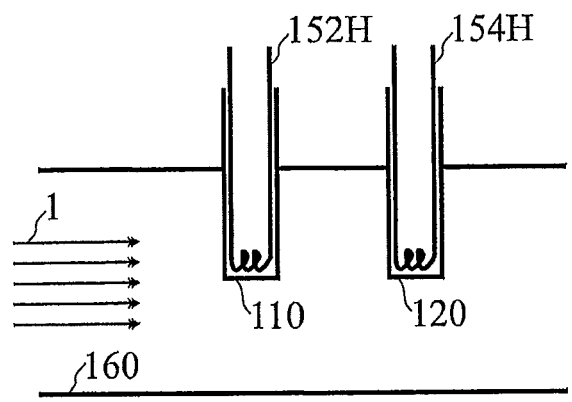

FIG. 3B illustrates exemplary embodiments of the first and sensor unit 110 and the second sensor unit 120. In FIG. 3B, the sensor units are mounted to a pipe 160 for determining the flow rate of the fluid 1 within the pipe 160. The sensor unit 110 includes a heating device 152H, and the second sensor unit 120 includes a heating device 154H.

According to exemplary embodiments which can be combined with any of the embodiments described herein, the first and/or the second sensor includes at least one of the elements selected from the group comprising (e.g., consisting of): a sensor surface determining size and shape of the sensor unit, a temperature sensor for sensing temperature, a heating device for heating the sensor unit, a cooling device for actively cooling the sensor unit. The first and/or second sensor unit can be adapted for determining the temperature of the fluid, e.g. before or after the diagnosis cycle. The temperature sensor of the first and/or second sensor unit can be bandgap temperature sensor as, for example, described in paragraph [0019] of EP 1512 948 A1. Additional sensor units can be provided, e.g. a third sensor unit. The additional sensor units may include the same or similar elements.

Figure 3C:
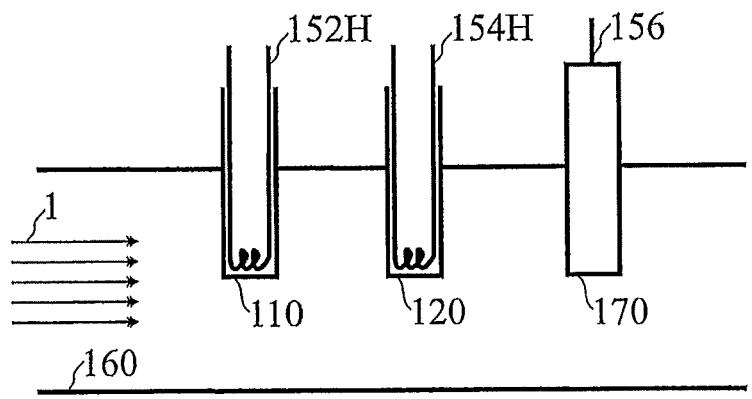

In FIG. 3C, an embodiment of a flowmeter including a third sensor unit 170 is illustrated. The third sensor unit 170 is configured to determine the temperature of the fluid during the diagnosis cycle. In exemplary embodiments, the third sensor 170 can be configured to determine the temperature of the fluid at the measurement time at which the first sensor unit 110 and the second sensor unit 120 measure the values TM1, TM2, PM1, PM2 for determining the diagnosis result therefrom. The sensor unit 170 is operatively connected to the evaluation unit 140, shown in FIG. 3A, via connection 156. The third sensor 170 shown in FIG. 3C need not include a heating device and need not be controlled by the thermal control unit. Hence, the third sensor 170 may be less expensive than the other sensors.

Figure 4:
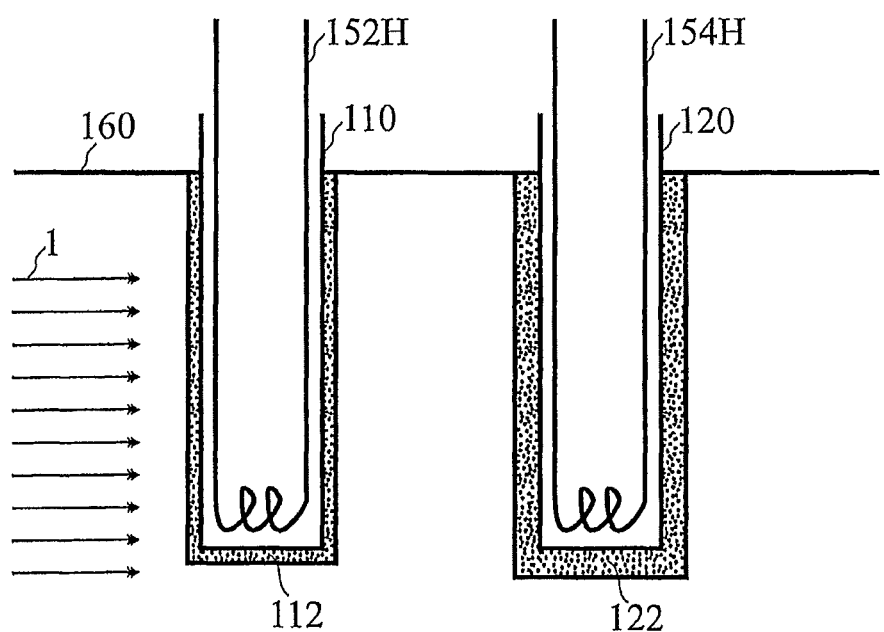
FIG. 4 shows a first and a second sensor unit of a flowmeter in accordance with exemplary embodiments described herein.

It may happen that at least one of the sensor units 110, 120 is coated by a coating. In FIG. 4, a coating 112 on the first sensor unit and a coating 122 on the second sensor unit are shown. The first sensor unit 110 is normally operated at a lower temperature, e.g. the temperature of the fluid, as compared to the second sensor unit 120. Under these circumstances, as illustrated in FIG. 4, the coating 122 on the second sensor unit 120 can be thicker than the coating 112 on the first sensor unit 110. To detect a coating or malfunction of at least one of the sensors, the evaluation unit can determine a diagnosis result.

According to exemplary embodiments described herein, the evaluation unit of the flowmeter can be operatively connected to the first and the second sensor unit and can be configured to determine the value of the temperature $T_0$ of the fluid, for instance via signals provided by the first sensor unit before and/or after the diagnosis cycle, or via signals provided by a third sensor of the flowmeter during the diagnosis cycle. The evaluation unit can be configured to determine a temperature TM1 of the first sensor unit and a power PM1 applied to the first sensor unit, and to simultaneously determine a temperature TM2 of the second sensor unit and a power PM2 applied to the second sensor unit. The evaluation unit can also be configured to determine a first heat transfer related quantity at least from the temperature TM2, and determining a second heat transfer related quantity at least from the temperature TM1. In exemplary embodiments, the first heat transfer related quantity can be determined from the temperatures TM1 and TM2 and from the applied powers PM1 and PM2, and the second heat transfer related quantity can be determined from the temperatures TM1 and TM0 and from the applied power PM1. The evaluation unit can be further configured to determine a diagnosis result by setting into relation the first heat transfer related quantity and the second heat transfer related quantity. The relation may be the ratio (e.g., the dimensionless ratio), of the first and second heat transfer related quantity.

The first and second heat transfer related quantities and the diagnosis result may be selected from the respective groups described in the foregoing. The thermal control unit can be configured to operate according to the constant temperature mode or the constant power mode as described herein. Further, the thermal control unit can be can be configured to carry out at least one, some, or all of the AC diagnostic steps described above.

In exemplary embodiments, the evaluation unit and/or the thermal control unit can be configured to carry out the method steps according to any of the embodiments described herein. The evaluation unit and/or the thermal control unit may include a memory for storing program code, such as evaluation algorithms and thermal control algorithms, respectively. The program code, when executed by the evaluation unit and/or the thermal control unit, causes the evaluation unit and/or the thermal control unit to perform method steps according to any of the embodiments described herein.

The evaluation unit may be a unit selected from the group consisting of: a computer, a PC, a microcontroller, and one or more FPGAs. The temperature control unit may be a unit selected from the group consisting of: a computer, a PC, a microcontroller, a DSP, and one or more FPGAs, or other electronics. The evaluation unit and the temperature control unit may be integrated into one single device. While the evaluation unit and the temperature control unit are described as part of the flowmeter in the foregoing, any one of them may be an external unit according to other embodiments. The flowmeter can include at least one component selected from the group consisting of: anemometers, CMOS anemometers, anemometers including at least one sensor unit, CMOS anemometers including at least one sensor unit, anemometers including at least one sensor unit and at least one heating element, CMOS anemometers including at least one sensor unit and at least one heating element. The flowmeter can include components as described in paragraphs [0017] to [0019] of EP 1 512 948 A1, which is incorporated herein by reference in its entirety. All components of the flowmeter can, in exemplary embodiments, be integrated on a single chip.

Further exemplary embodiments relate to methods of operating the flowmeter according to any of the embodiments described herein. Further exemplary embodiments relate to the use of the flowmeter according to any of the embodiments disclosed herein. Further exemplary embodiments relate to the use of the flowmeter for carrying out a method for diagnosis according to any of the embodiments described herein.

As will be understood by a person skilled in the art, the notion of "power", "heating power", and "cooling power" may be replaced by corresponding notions (e.g., notions of voltage or current). The power is proportional to voltage and to current. For example, if the voltage is fixed, the notion of "power" can be replaced by "current". Similarly, if the current is constant, the notion of "power" can be replaced by "voltage".

While the foregoing is directed to exemplary embodiments, other and further embodiments may be devised without departing from the basic scope, and the scope is determined by the claims that follow.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for diagnosis of a flowmeter, comprising:
   thermally coupling a first sensor unit and a second sensor unit to a fluid, the fluid having a temperature $TM0$;
   actively heating or cooling the first sensor unit by applying power $PM1$ to the first sensor unit such that the temperature $TM1$ of the first sensor unit is different from the temperature $TM0$ of the fluid, and simultaneously actively heating or cooling the second sensor unit by applying power $PM2$ to the second sensor unit such that the temperature $TM2$ of the second sensor unit is different from the temperature $TM0$ of the fluid;
   determining a temperature $TM1$ of the first sensor unit and the power $PM1$ applied to the first sensor unit, and simultaneously determining the temperature $TM2$ of the second sensor unit and the power $PM2$ applied to the second sensor unit;
   determining at least two independent quantities related to heat transfer of the first and second sensor units, each of the at least two independent heat transfer related quantities being determined from at least one of $TM0$, $TM1$, $TM2$, $PM1$, and $PM2$; and
   determining a diagnosis result by setting into relation the at least two independent heat transfer related quantities.

2. The method according to claim 1, comprising:
   determining the temperature $TM0$ of the fluid.

3. The method according to claim 2, wherein the determining the temperature $TM0$ comprises:
   measuring the temperature $TM0$ of the fluid by a third sensor unit.

4. The method according to claim 2, wherein the determining the temperature $TM0$ of the fluid comprises:
   measuring the temperature $TM0$ of the fluid by at least one of the first sensor unit and the second sensor unit prior to actively heating or cooling the first sensor unit and the second sensor unit.

5. The method according to claim 4, comprising:
   storing the measured temperature $TM0$ of the fluid.

6. The method according to claim 1, wherein the determining the at least two independent heat transfer related quantities comprises at least one of:
   determining a first heat transfer related quantity among the heat transfer related independent quantities using the temperatures $TM1$ and $TM2$ and the applied powers $PM1$ and $PM2$;
   determining a second heat transfer related quantity using the temperatures $TM0$, $TM1$ and the applied power $PM1$; and
   determining a third heat transfer related quantity using the temperatures $TM0$, $TM2$ and the applied power $PM2$.

7. The method according to claim 6,
   wherein the determining the first heat transfer quantity comprises calculating one of:
     a first thermal conductance $(PM2-PM1)/(TM2-TM1)$ as the first heat transfer quantity;
     a first flow rate as the first heat transfer quantity; and
     a first flow rate from the temperature difference $(TM2-TM1)$ and the power difference $(PM2-PM1)$ as the first heat transfer quantity,
   wherein the determining the second heat transfer related quantity comprises calculating one of:
     a second thermal conductance $P1/(TM1-TM0)$ as the second heat transfer related quantity; and
     a second flow rate as the second hear transfer related quantity, and
   wherein the determining the third heat transfer related quantity comprises calculating one of:
     a third thermal conductance $PM2/(TM2-TM0)$ as the third heat transfer related quantity; and
     a third flow rate as the third heat transfer related quantity.

8. The method according to claim 1, wherein the determining the at least two independent heat transfer related quantities comprises at least two of:
   determining a first heat transfer related quantity among the heat transfer related independent quantities using the temperatures $TM1$ and $TM2$ and the applied powers $PM1$ and $PM2$;
   determining a second heat transfer related quantity using the temperatures $TM0$, $TM1$ and the applied power $PM1$; and
   determining a third heat transfer related quantity using the temperatures $TM0$, $TM2$ and the applied power $PM2$.

9. The method according to claim 8,
   wherein the determining the first heat transfer quantity comprises calculating one of:
     a first thermal conductance $(PM2-PM1)/(TM2-TM1)$ as the first heat transfer quantity;
     a first flow rate as the first heat transfer quantity; and
     a first flow rate from the temperature difference $(TM2-TM1)$ and the power difference $(PM2-PM1)$ as the first heat transfer quantity,
   wherein the determining the second heat transfer related quantity comprises calculating one of:

a second thermal conductance P1/(TM1−TM0) as the second heat transfer related quantity; and a second flow rate as the second hear transfer related quantity, and wherein the determining the third heat transfer related quantity comprises calculating one of:

a third thermal conductance PM2/(TM2−TM0) as the third heat transfer related quantity; and a third flow rate as the third heat transfer related quantity.

10. The method according to claim 1, wherein the setting into relation the at least two independent heat transfer related quantities comprises one of:

calculating the ratio of the at least two independent heat transfer related quantities; and calculating the difference of the at least two independent heat transfer related quantities.

11. The method according to claim 1, wherein the determined diagnosis result is indicative of at least one of:

a coating on the first sensor unit, a coating on the second sensor unit, an abrasion of material on the first sensor unit, an abrasion of material on the second sensor unit, a malfunctioning of the first sensor unit, a malfunctioning of the second sensor unit, a miscalibration of the first sensor unit, and a miscalibration of the second sensor unit.

12. The method according to claim 1, wherein the actively heating or cooling the first sensor unit comprises actively heating or cooling the first sensor unit to the temperature TM1, the temperature TM1 being controlled, and the determining the power PM1 comprises measuring the power PM1; and wherein the actively heating or cooling the second sensor unit comprises actively heating or cooling the second sensor unit to the temperature TM2, the temperature TM2 being controlled relative to the temperature TM0 or TM1, and the determining the power PM2 comprises measuring the power PM2; or the actively heating or cooling the second sensor unit comprises actively heating or cooling the second unit with the power PM2, the power PM2 being controlled either absolutely or relative to the power PM1, and the determining the temperature TM2 comprises measuring the temperature TM2.

13. The method according to claim 1, wherein the actively heating or cooling the first sensor unit comprises actively heating or cooling the first sensor unit with the power PM1, the power PM1 being controlled, and the determining the temperature TM1 comprises measuring the temperature TM1; and wherein the actively heating or cooling the second sensor unit comprises actively heating or cooling the second sensor unit to the temperature TM2, the temperature TM2 being controlled relative to the temperature TM0 or TM1, and the determining the power PM2 comprises measuring the power PM2; or the actively heating or cooling the second sensor unit comprises actively heating or cooling the second unit with the power PM2, the power PM2 being controlled either absolutely or relative to the power PM1, and the determining the temperature TM2 comprises measuring the temperature TM2.

14. The method according to claim 1, wherein the determining the diagnosis result comprises:

determining the diagnosis result and a flow rate of the fluid from a combination of the at least two independent heat transfer related quantities.

15. The method according to claim 1, wherein heating or actively cooling the first sensor unit and simultaneously heating or actively cooling the second sensor unit include applying a time varying power and/or temperature to at least one of the sensor units, wherein the method comprises:

determining at least one time-dependent heat-transfer related quantity, and wherein determining the diagnosis result comprises determining the diagnosis result using the at least one time-dependent heat-transfer related quantity.

16. The method according to claim 15, wherein the at least one time-dependent heat-transfer related quantity includes at least one thermal conductance.

17. A flowmeter for flow rate measurement of a fluid and for diagnosis of at least one of a first sensor unit and a second sensor unit, the flowmeter comprising:

a first sensor unit configured for thermally coupling to a fluid, the first sensor unit comprising a first temperature sensor and at least one first component selected from the group consisting of: a first heating device and a first cooling device;

a second sensor unit configured for thermally coupling to a fluid, the second sensor unit comprising a second temperature sensor and at least one second component selected from the group consisting of: a second heating device and a second cooling device;

a thermal control unit operatively connected to the first sensor unit and to the second sensor unit, the thermal control unit being configured for:

applying power to the at least one first component;

applying power to the at least one second component; and simultaneously, individually, and actively heating or cooling the first sensor unit and the second sensor unit such that the respective temperatures TM1 and TM2 of the first sensor unit and the second sensor unit are different from the temperature TM0 of the fluid; and an evaluation unit operatively connected to the first and the second sensor unit, the evaluation unit being configured for:

determining the temperature TM1 of the first sensor unit by the first temperature sensor and the power PM1 applied to the at least one first component, and simultaneously determining the temperature TM2 of the second sensor unit by the second temperature sensor and the power PM2 applied to the at least one second component;

determining at least two independent quantities related to heat transfer of the first and second sensor units, each of the at least two independent heat transfer related quantities being determined from at least one of TM0, TM1, TM2, PM1, and PM2; and determining a diagnosis result by setting into relation the at least two independent heat transfer related quantities.

18. The flowmeter according to claim 17, wherein the thermal control unit is configured for heating or cooling the first sensor unit and the second sensor unit such that the respective temperatures TM1 and TM2 of the first sensor unit and the second sensor unit are different from the temperature TM0 of the fluid, and such that the respective temperatures TM1 and TM2 of the first sensor unit and the second sensor unit are different from one another.

19. The flowmeter according to claim 17, wherein the evaluation unit is configured for determining the temperature TM0 of the fluid.

20. The flowmeter according to claim 17, wherein the determination by the evaluation unit of the at least two independent heat transfer related quantities comprises at least one of:
  determining a first heat transfer related quantity using the temperatures TM1 and TM2 and the applied powers PM1 and PM2;
  determining a second heat transfer related quantity using the temperatures TM0, TM1 and the applied power PM1; and
  determining a third heat transfer related quantity using the temperatures TM0, TM2 and the applied power PM2.

21. The flowmeter according to claim 20,
  wherein the determining the first heat transfer quantity comprises calculating one of:
    a first thermal conductance (PM2−PM1)/(TM2−TM1) as the first heat transfer quantity;
    a first flow rate as the first heat transfer quantity; and
    a first flow rate from the temperature difference (TM2−TM1) and the power difference (PM2−PM1) as the first heat transfer quantity,
  wherein the determining the second heat transfer related quantity comprises calculating one of:
    a second thermal conductance P1/(TM1−TM0) as the second heat transfer related quantity; and
    a second flow rate as the second hear transfer related quantity, and
  wherein the determining the third heat transfer related quantity comprises calculating one of:
    a third thermal conductance PM2/(TM2−TM0) as the third heat transfer related quantity; and
    a third flow rate as the third heat transfer related quantity.

22. The flowmeter according to claim 17, wherein the determined diagnosis result is indicative of at least one of:
  a coating on the first sensor unit, a coating on the second sensor unit, an abrasion of material on the first sensor unit, an abrasion of material on the second sensor unit, a malfunctioning of the first sensor unit, a malfunctioning of the second sensor unit, a miscalibration of the first sensor unit, and a miscalibration of the second sensor unit.

23. The flowmeter according to claim 17, wherein the thermal control unit is configured for at least one of:
  a.) actively heating or cooling the first sensor unit to the temperature TM1, and actively heating or cooling the second sensor unit to the temperature $T_2$, wherein the temperature TM1 and the temperature TM2 are controlled by the thermal control unit either absolutely or relative to each other;
  b) actively heating or cooling the first sensor unit by applying the power PM1, and actively heating or cooling the second sensor unit by applying the power PM2, wherein the power PM1 and the power PM2 are controlled either absolutely or relative to each other by the thermal control unit;
  c) actively heating or cooling the first sensor unit by applying the power PM1, and actively heating or cooling the second sensor unit to the temperature TM2, wherein the power PM1 and the temperature TM2 are controlled by the thermal control unit either absolutely or relative to the power PM2 or the temperature TM1; and
  d) actively heating or cooling the first sensor unit to the temperature TM1, and actively heating or cooling the second sensor unit by applying the power PM2, wherein the temperature TM1 and the power PM2 are controlled by the thermal control unit either absolutely or relative to the power PM1 or the temperature TM2.

24. The flowmeter according to any of the claim 17, comprising:
  a third detector for measuring the temperature TM0 of the fluid.

* * * * *